United States Patent
Suciu et al.

(10) Patent No.: US 10,421,553 B2
(45) Date of Patent: Sep. 24, 2019

(54) PUSHER FAN ENGINE WITH IN WING CONFIGURATION

(71) Applicant: United Technologies Corporation, Hartford, CT (US)

(72) Inventors: Gabriel L. Suciu, Glastonbury, CT (US); Wesley K. Lord, South Glastonbury, CT (US); Jesse M. Chandler, South Windsor, CT (US)

(73) Assignee: United Technologies Corporation, Farmington, CT (US)

( * ) Notice: Subject to any disclaimer, the term of this patent is extended or adjusted under 35 U.S.C. 154(b) by 85 days.

(21) Appl. No.: 14/600,946

(22) Filed: Jan. 20, 2015

(65) Prior Publication Data

US 2016/0207631 A1 Jul. 21, 2016

(51) Int. Cl.
| | |
|---|---|
| *B64C 3/32* | (2006.01) |
| *B64D 27/18* | (2006.01) |
| *B64D 33/02* | (2006.01) |
| *B64D 29/02* | (2006.01) |
| *B64D 27/12* | (2006.01) |
| *F02K 3/062* | (2006.01) |

(52) U.S. Cl.
CPC ............. *B64D 27/18* (2013.01); *B64C 3/32* (2013.01); *B64D 27/12* (2013.01); *B64D 29/02* (2013.01); *B64D 33/02* (2013.01); *F02K 3/062* (2013.01); *B64D 2033/0286* (2013.01)

(58) Field of Classification Search
CPC ........ B64D 27/12; B64D 27/18; B64D 29/02; B64D 33/02; B64D 2033/0226; B64D 2033/0286; B64C 3/32; F02K 3/062; F02K 3/065
See application file for complete search history.

(56) References Cited

U.S. PATENT DOCUMENTS

| | | | | |
|---|---|---|---|---|
| 2,447,100 A | * | 8/1948 | Stalker | B64D 27/18 244/15 |
| 2,478,206 A | * | 8/1949 | Redding | F02K 3/062 60/226.1 |
| 2,526,941 A | * | 10/1950 | Fishbein | B64D 27/12 244/15 |
| 2,608,821 A | * | 9/1952 | Hunsaker | F02C 3/067 60/268 |
| 2,835,162 A | | 5/1958 | Harrington et al. | |
| 3,282,053 A | * | 11/1966 | Messerschmitt | F02K 7/16 60/226.1 |
| 3,425,665 A | * | 2/1969 | Lingwood | F01D 11/08 415/134 |
| 3,625,008 A | * | 12/1971 | Hewson | F02K 3/068 60/226.1 |

(Continued)

FOREIGN PATENT DOCUMENTS

| | | | | |
|---|---|---|---|---|
| DE | 102008024463 A1 | * | 12/2009 | ............ B64C 39/068 |
| FR | 1284333 A | * | 2/1962 | ............. B64D 27/12 |

(Continued)

OTHER PUBLICATIONS

Worobel et al., "Q-Fans for General Aviation Aircraft", NASA CR 114665, Dec. 1973.

*Primary Examiner* — Richard R. Green

(74) *Attorney, Agent, or Firm* — O'Shea Getz P.C.

(57) ABSTRACT

An aircraft is provided that includes a wing and a pusher fan engine. The pusher fan engine is configured in the wing.

18 Claims, 10 Drawing Sheets

(56) References Cited

U.S. PATENT DOCUMENTS

| | | | | |
|---|---|---|---|---|
| 3,678,690 | A | * | 7/1972 | Shohet .................. F02C 3/10 |
| | | | | 244/53 R |
| 6,527,224 | B2 | * | 3/2003 | Seidel .................. B64D 33/02 |
| | | | | 244/53 A |
| 7,134,271 | B2 | * | 11/2006 | Baughman ............. F02K 3/062 |
| | | | | 60/226.1 |
| 7,624,944 | B2 | * | 12/2009 | Parikh ................... B64C 21/00 |
| | | | | 137/15.1 |
| 8,210,798 | B2 | | 7/2012 | Stern |
| 8,701,380 | B2 | * | 4/2014 | Vuillemin .............. B64C 11/28 |
| | | | | 60/268 |
| 8,764,381 | B2 | | 7/2014 | Stern |
| 2008/0094632 | A1 | | 4/2008 | Harsh et al. |
| 2012/0292435 | A1 | * | 11/2012 | Karem ..................... B64C 1/00 |
| | | | | 244/36 |
| 2013/0062463 | A1 | | 3/2013 | Lord |
| 2014/0169972 | A1 | | 6/2014 | Suciu et al. |
| 2014/0252160 | A1 | | 9/2014 | Suciu et al. |
| 2014/0252161 | A1 | | 9/2014 | Gukeisen et al. |
| 2014/0260182 | A1 | | 9/2014 | Suciu et al. |
| 2014/0260183 | A1 | | 9/2014 | Suciu et al. |
| 2016/0144967 | A1 | * | 5/2016 | Golshany ............... B64D 27/18 |
| | | | | 244/54 |

FOREIGN PATENT DOCUMENTS

| | | | | | |
|---|---|---|---|---|---|
| GB | | 629143 | A | * | 9/1949 ............ B64D 27/18 |
| GB | | 1211081 | A | * | 11/1970 ............ B64D 27/18 |

* cited by examiner

PUSHER FAN ENGINE WITH IN WING CONFIGURATION

BACKGROUND OF THE INVENTION

1. Technical Field

This disclosure relates generally to an aircraft propulsion system and, more particularly, a pusher fan engine.

2. Background Information

Various types of turbine engines for propelling an aircraft are known in the art. An example of one such turbine engine is a turbofan engine which includes a fan forward of its core. Another example of a turbine engine is a pusher fan engine which includes a fan aft of its core. Still another example of a turbine engine is a propfan engine which includes an uncovered or unshrouded propeller (instead of a fan) aft of its core. While each of the foregoing turbine engine types have various advantages, there is still a need in the art for improvement.

SUMMARY OF THE DISCLOSURE

According to an aspect of the invention, an aircraft is provided that includes a wing. The aircraft also includes a pusher fan engine configured with the wing.

According to another aspect of the invention, another aircraft is provided that includes a wing and a pusher fan engine. The pusher fan engine includes a fan rotor and a nacelle housing the fan rotor. The wing intersects the nacelle.

According to still another aspect of the invention, a pusher fan engine is provided for arranging with a wing of an aircraft. The pusher fan engine includes a core, a pusher fan rotor downstream of the core, and a nacelle housing the pusher fan rotor. The nacelle is configured to be mounted to and integrated with the wing.

An inlet duct may extend within the wing to a core of the pusher fan engine. The inlet duct may extend at least from an inlet arranged at a side of the wing.

The nacelle may be configured to be intersected by the wing.

The pusher fan engine may have a generally mid-wing configuration.

The pusher fan engine may include a nacelle. The wing may intersect the nacelle.

An inlet duct may extend within the wing to a core of the pusher fan engine.

The inlet duct may extend from an inlet arranged at a side of the wing.

The side may be a suction side of the wing.

A splitter may be configured between the side and the inlet. The splitter may be adapted to at least partially divert wing boundary layer air away from the inlet.

The pusher fan engine may include a core generally aligned with the wing.

The wing may include a pair of ribs. The pusher fan engine may include a core and a fan casing. The core may be disposed spanwise between the ribs. The fan casing may be mounted to the ribs.

The pusher fan engine may include one or more guide vanes structurally tying the core with the fan casing.

The pusher fan engine may be disposed adjacent a trailing edge of the wing.

The pusher fan engine may be configured as a geared pusher fan engine.

The pusher fan engine may include a fan rotor, a turbine rotor and a gear train connecting the turbine rotor with the fan rotor.

The turbine rotor may be a free turbine rotor.

The pusher fan engine may include a fan rotor and a core axially forward of the fan rotor.

An axis of rotation of the fan rotor may be non-coaxial with an axis of rotation of the core.

The foregoing features and the operation of the invention will become more apparent in light of the following description and the accompanying drawings.

DETAILED DESCRIPTION OF THE INVENTION

Figure 1:
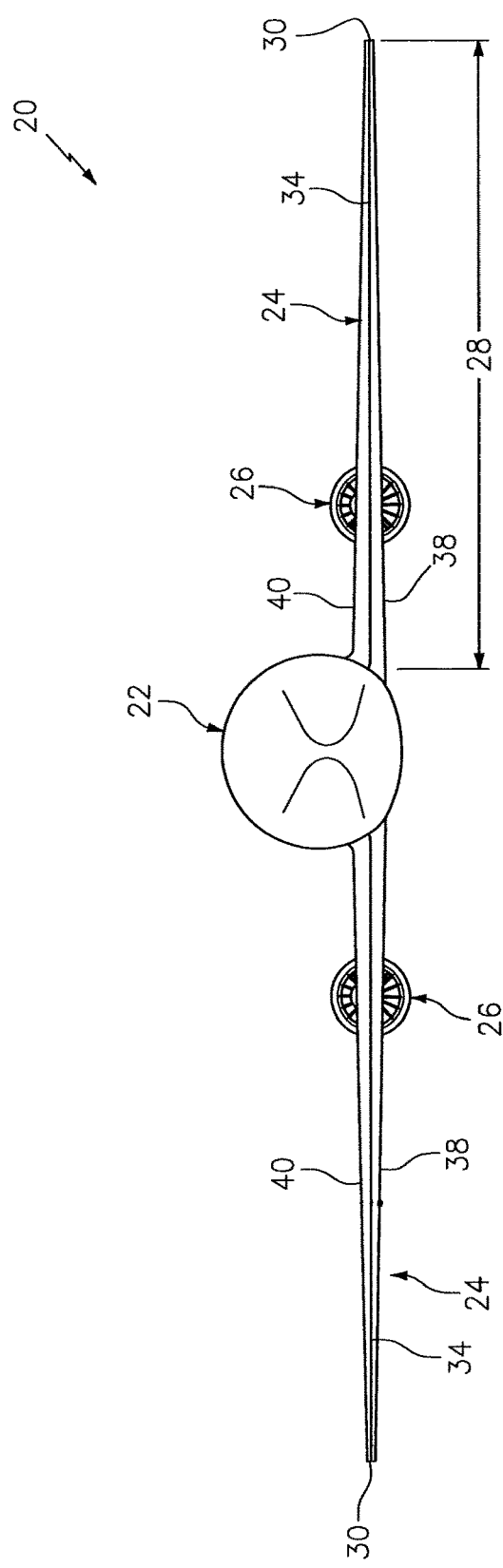
FIG. 1 is a front view illustration of an aircraft with a plurality of illustrative pusher fan engines configured in wing.
Figure 2:
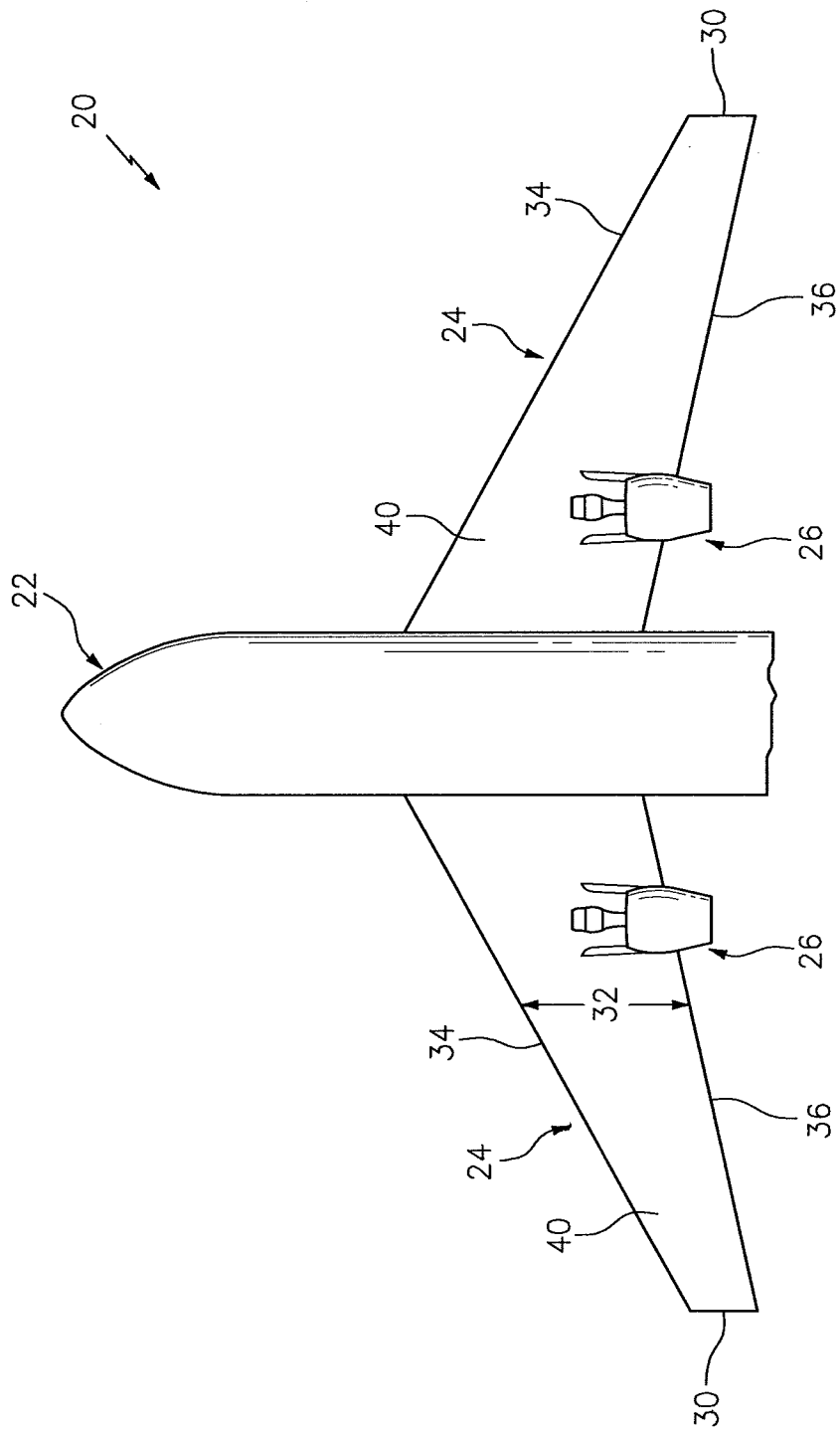
FIG. 2 is a partial top view illustration of the aircraft of FIG. 1.
Figure 3:
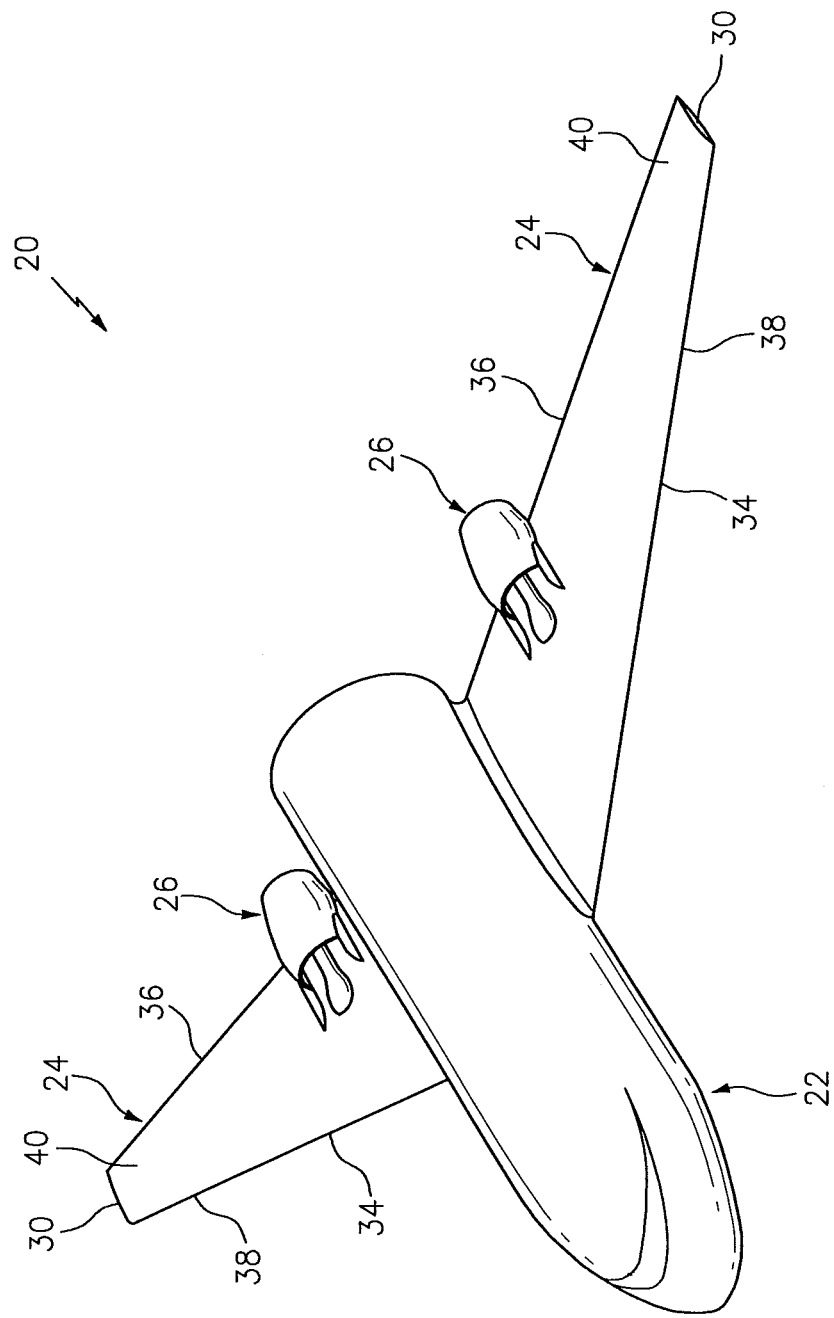
FIG. 3 is a partial front perspective illustration of the aircraft of FIG. 1.

FIGS. 1-3 illustrate an aircraft 20 configured as a jet airplane. This aircraft 20 includes a fuselage 22, one or more wings 24 and one or more pusher fan engines 26. The wings 24 are disposed on and connected to opposing sides the fuselage 22. While these wings 24 are shown as being connected to a gravitational bottom portion of the fuselage 22, the wings 24 may alternatively be connected to a gravitational mid or top portion of the fuselage 22. Furthermore, while these wings 24 are shown as main or general lift wings, the wings 24 may alternatively be stabilizer wings, or any other type of wing.

Each of the wings 24 has a span 28 (see FIG. 1) that extends from the fuselage 22 to a wing tip 30. Each of the wings 24 has a chord 32 (see FIG. 2) that extends from an upstream leading edge 34 to a downstream trailing edge 36. Each of the wings 24 has a pressure (e.g., bottom) side 38 and a suction (e.g., top) side 40. These sides 38 and 40 extend spanwise (e.g., along the span 28) from the fuselage 22 to the wing tip 28. The sides 38 and 40 extend chordwise (e.g., along the chord 32) from the leading edge 34 to the trailing edge 36.

Figure 4:
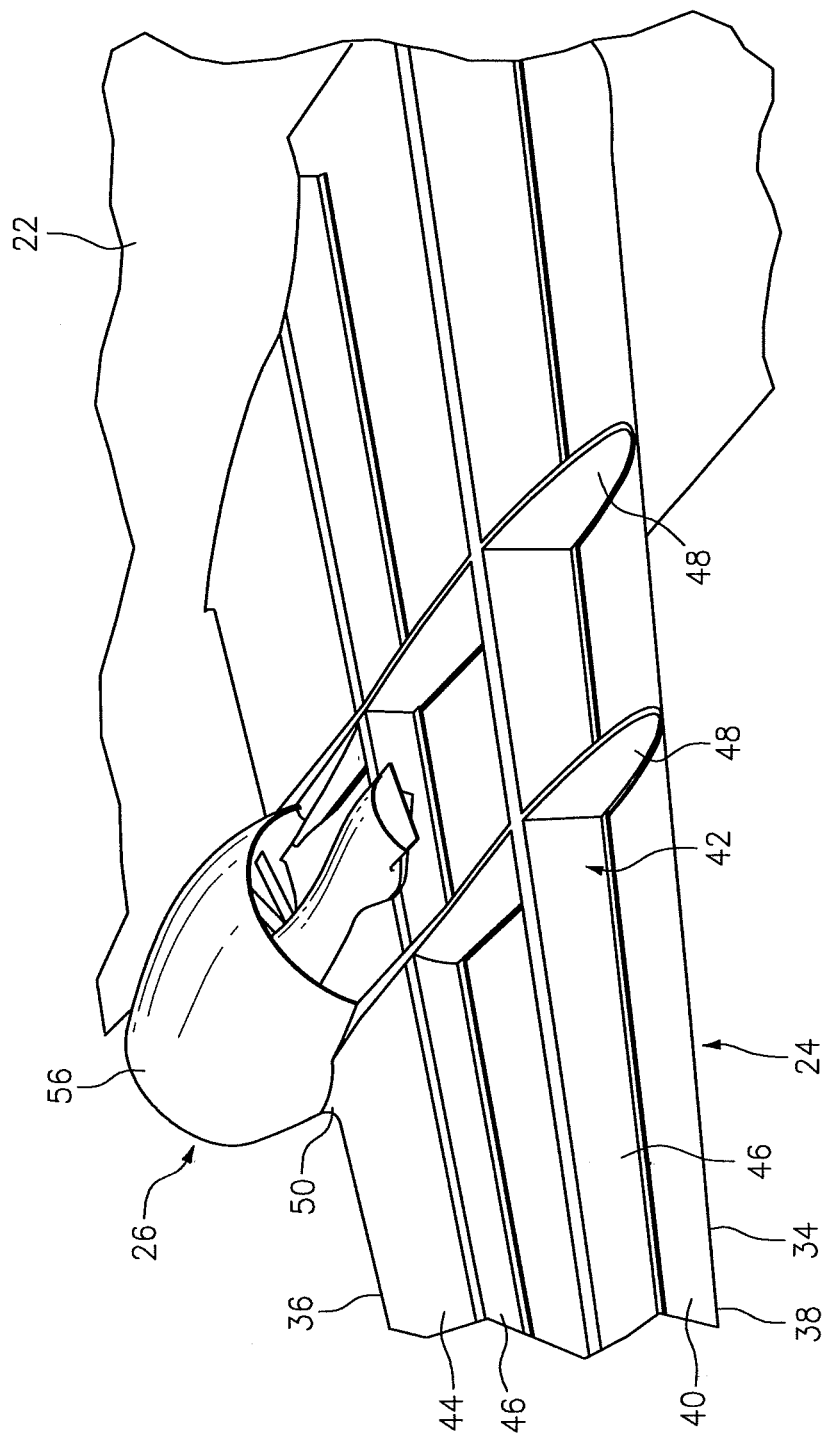
FIG. 4 is a front perspective illustration of an embodiment of a pusher fan engine configured in wing, where the skin of the wing is shown as semi-transparent.

Referring to FIG. 4, each of the wings 24 includes an internal support structure 42 and an outer skin 44, which forms the pressure side 38 and the suction side 40. Each of the wings 24, of course, may also include one or more other components such as, for example, ailerons, flaps, elevators, rudders, slats, spoilers, etc. Such additional components, however, are not shown in the drawings for ease of illustration.

The support structure 42 is configured to provide a rigid backbone for the skin 44, which skin 44 is wrapped around and connected to the support structure 42. The support structure 42 is also configured to structurally tie the wing 24 and at least one of the pusher fan engines 26 to the fuselage 22. The support structure 42 of FIG. 4 includes, for example, one or more spars 46 and one or more ribs 48. The spars 46 extend along the span 28 of the wing 24 and are secured to the fuselage 22. The ribs 48 extend along the chord 32 of the wing 24. A pair of these ribs 48 are also configured to structurally tie a respective one of the pusher fan engines 26 to the spars 46. For example, a structural outer casing 50 (e.g., a fan casing), which is shown more clearly in FIG. 6, may be positioned spanwise between and attached (e.g., mechanically fastened and/or bonded) to the ribs 48. With this configuration, the ribs 48 may provide traditional engine "pylon" functionality.

Figure 5:
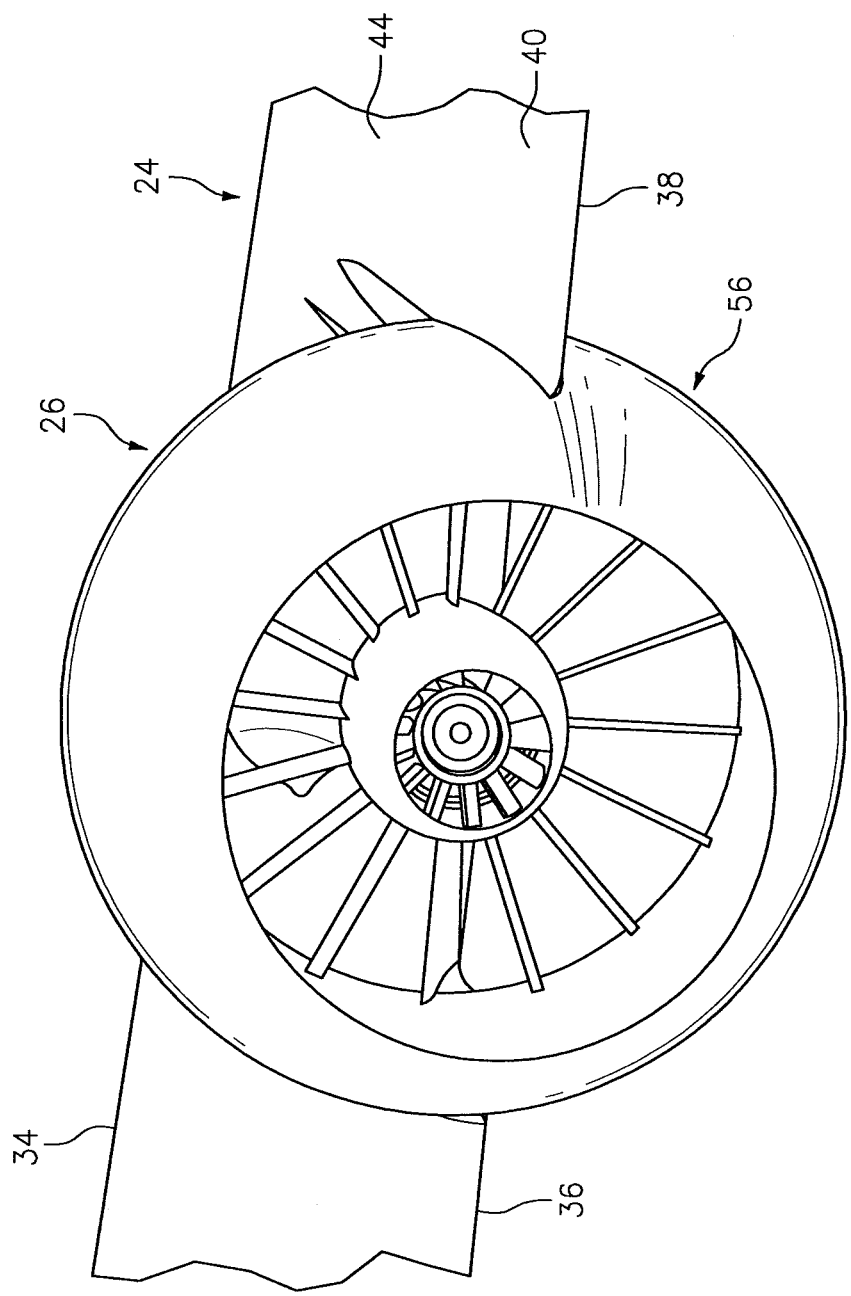
FIG. 5 is a rear perspective illustration of the pusher fan engine of FIG. 4.

Each pusher fan engine 26 is configured with and in a respective one of the wings 24. The pusher fan engine 26 of FIGS. 4 and 5, for example, is bisected by and connected to the respective wing 24; e.g., the engine 26 has a generally mid-wing configuration. Although the wing 24 is shown as intersecting a middle portion of the pusher fan engine 26 (e.g., mid-way), the wing 24 may alternatively intersect a bottom portion of the engine 26 or a top portion of the engine 26. Furthermore, although the pusher fan engine 26 is shown at the trailing edge 36 of the wing 24, the engine 26 may alternatively be arranged at the leading edge 34 of the wing 24 or anywhere in between the leading and the trailing edges 34 and 36, as well as anywhere along the span 28 between the fuselage 22 and the wing tip 30.

Figure 6:
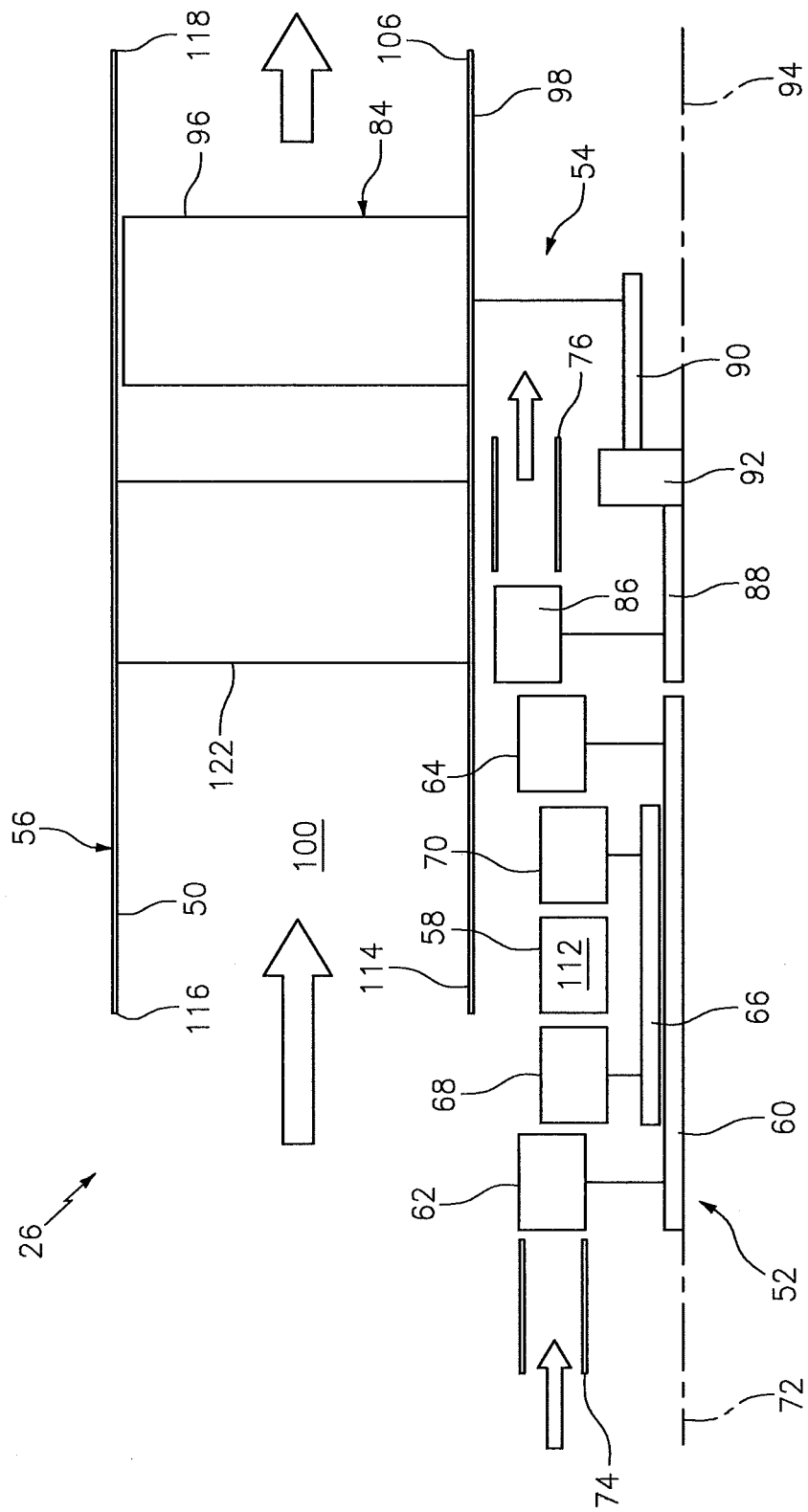
FIG. 6 is a partial schematic illustration of an embodiment of a pusher fan engine system.

Referring to FIG. 6, each pusher fan engine 26 includes a turbine engine core 52 and a pusher fan system 54. The pusher fan engine 26 also includes a turbine engine structure in the form of or otherwise including a nacelle 56 (also shown in FIGS. 4 and 5) which houses the turbine engine core 52 and the pusher fan system 54.

The turbine engine core 52 may be configured as a multi-spool turbine engine core and generally aligned with and within the wing 24. The turbine engine core 52 of FIG. 6, for example, includes a low speed spool, a high speed spool and a combustor 58. The low speed spool includes a low speed shaft 60 which connects a low pressure compressor (LPC) rotor 62 to a low pressure turbine (LPT) rotor 64. The high speed spool includes a high speed shaft 66 which connects a high pressure compressor (HPC) rotor 68 to a high pressure turbine (HPT) rotor 70. The rotors 62, 68, 70 and 64 are arranged sequentially along an axial centerline 72 (e.g., axis of rotation) of the turbine engine core 52 between a forward core airflow inlet 74 and an aft core airflow exhaust nozzle 76. The combustor 58 is arranged axially between the high pressure compressor rotor 68 and the high pressure turbine rotor 70.

Figure 7:
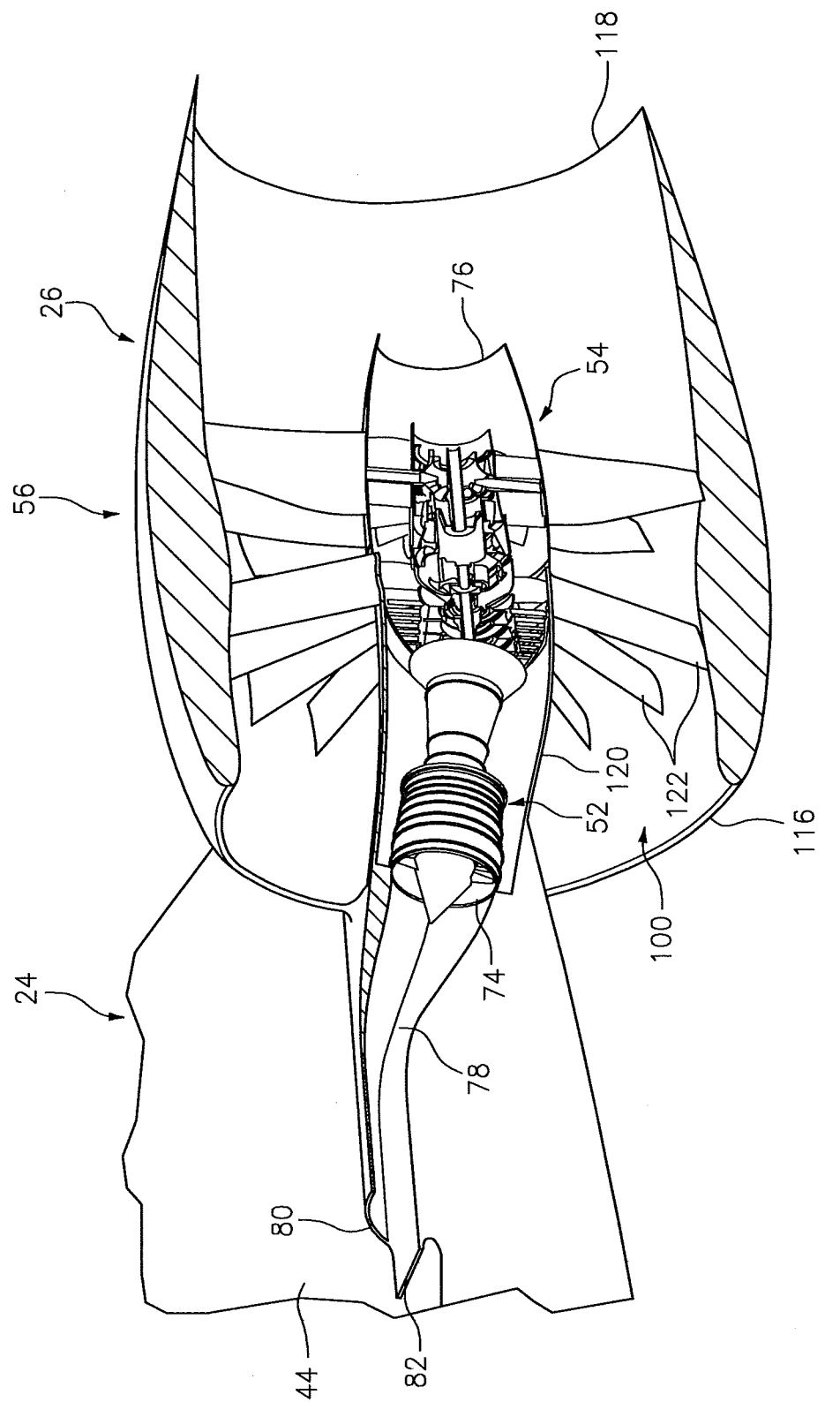
FIG. 7 is a side cutaway perspective illustration of the pusher fan engine of FIG. 4.

The core airflow inlet 74 is fluidly coupled with an inlet duct 78 as shown in FIG. 7. This inlet duct 78 may extend within the respective wing 24 from at least one inlet 80 to the core airflow inlet 74. The inlet 80 of FIG. 7 is arranged at (e.g., on, adjacent or proximate) the suction side 40 and, for example, generally midway between the leading edge 34 and the trailing edge 36. However, in alternate embodiments, the inlet 80 may be arranged at the pressure side 38 or elsewhere; e.g., at the leading edge 34. Furthermore, in some embodiments, the inlet duct 78 may extend from a plurality of inlets 80 at the pressure and/or suction sides 38 and 40.

Figure 8:
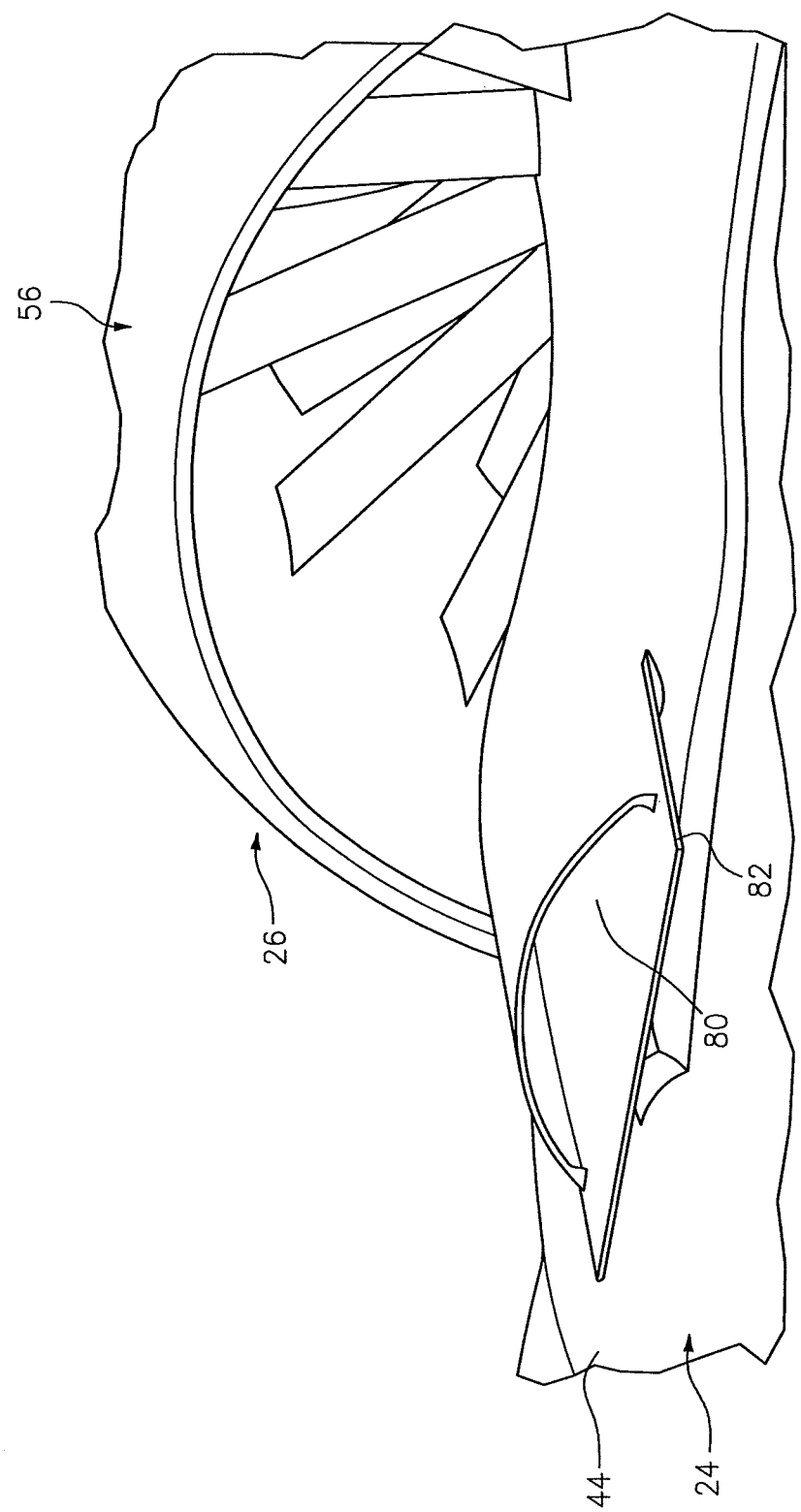
FIG. 8 is a partial front perspective illustration of the pusher fan engine of FIG. 4.

Referring to FIG. 8, a splitter 82 may be configured between the skin 44 and the inlet 80. This splitter 82 is adapted to at least partially divert wing boundary layer air away from the inlet 80. In this manner, the inlet 80 may receive (e.g., scoop) relatively laminar air at freestream total pressure into the inlet duct 78 and, thus, the turbine engine core 52. Wing boundary layer air, in contrast, is typically relatively turbulent with some total pressure loss relative to freestream.

Referring again to FIG. 6, the pusher fan system 54 is arranged downstream and aft of the turbine engine core 52. The pusher fan system 54 includes a fan rotor 84 connected to a turbine rotor 86. This turbine rotor 86 may be configured as a low pressure free turbine rotor and arranged next to and downstream of the low pressure turbine rotor 64 and, thus, aft of the turbine engine core 52. The turbine rotor 86 may be connected to the fan rotor 84 through one or more shafts 88 and 90 and/or a gear train 92. The gear train 92 may be an epicyclic transmission such as a planetary gear system or a star gear system. The gear train 92 may be configured as a reduction transmission such that the turbine rotor 86 rotates at a faster speed than the fan rotor 84.

Figure 9:
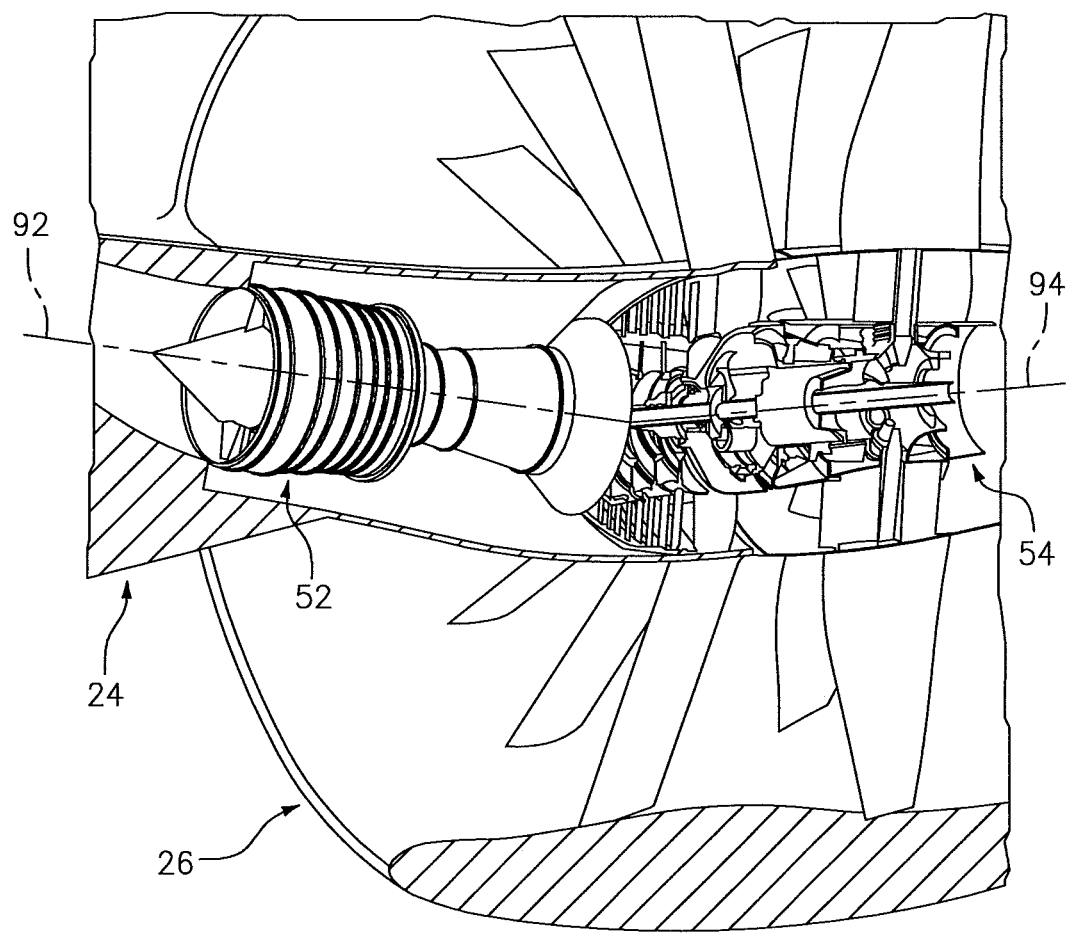
FIG. 9 is another side cutaway perspective illustration of the pusher fan engine of FIG. 4.

The fan rotor 84 is arranged aft of the turbine rotor 86 and the turbine engine core 52. The fan rotor 84 is rotatable about a centerline 94 (e.g., axis of rotation), which may be co-axial with the centerline 72 as shown in FIG. 6 or non-parallel as shown in FIG. 9.

Figure 10:
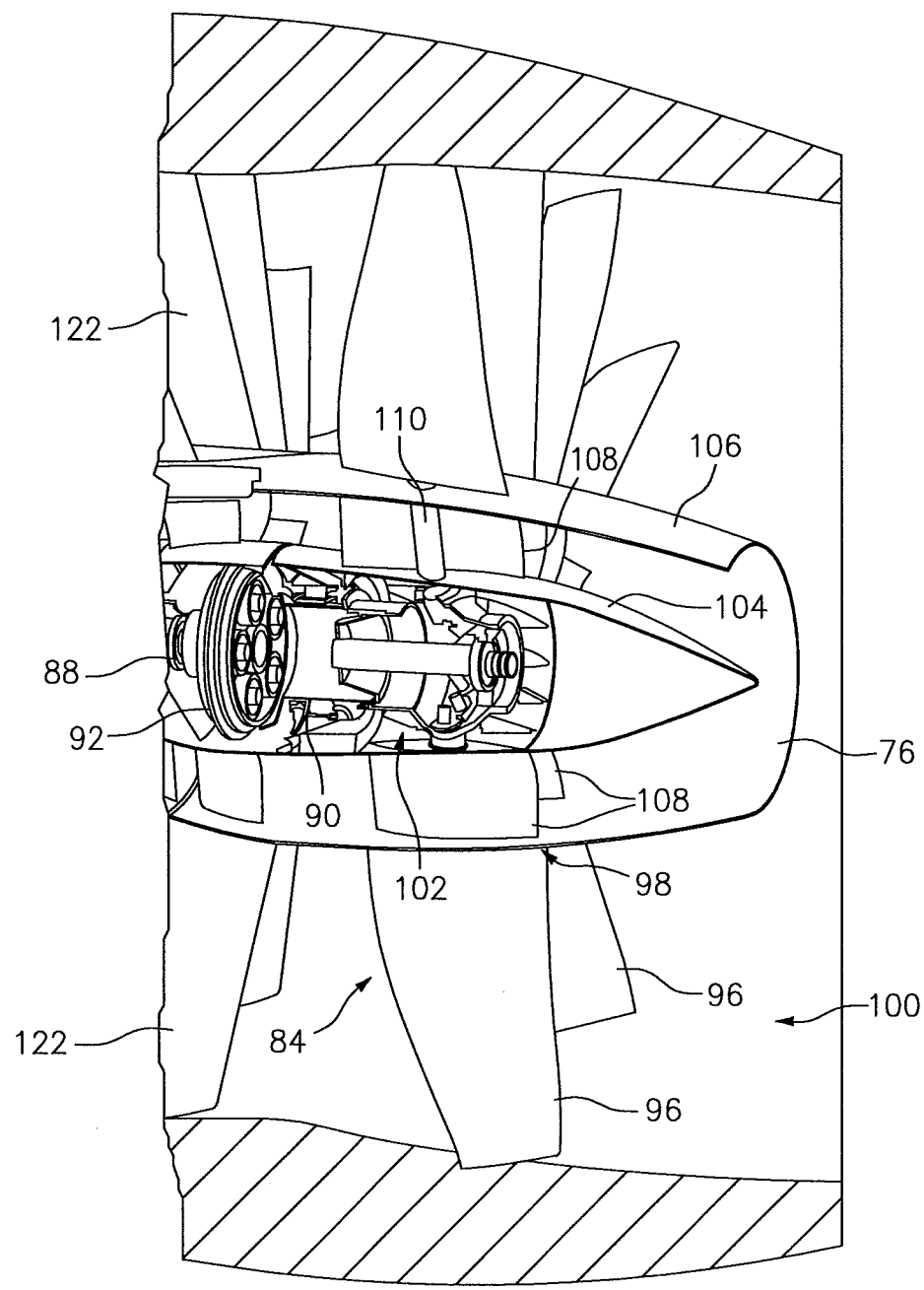
FIG. 10 is an enlarged illustration of a portion of the pusher fan engine illustrated in FIG. 9.

The fan rotor 84 includes a plurality of fan blades 96. These fan blades 96 are arranged around a fan rotor hub 98 and within an annular bypass flowpath 100. Referring to FIG. 10, each of the fan blades 96 may be pivotally connected to the fan rotor hub 98. With this configuration, a pitch of each fan blade 96 may be changed using an actuation system 102 within the fan rotor hub 98. The actuation system 102 may be configured for limited variable pitch. Alternatively, the actuation system 102 may be configured for full variable pitch where, for example, the fan blade 96 pitch may be completely reversed. Various actuations systems for pivoting fan blades 96 are known in the art and the present disclosure is not limited to any particular types or configurations thereof. Of course, in other embodiments, one or more of the fan blades 96 may be fixedly connected to the fan rotor hub 98.

The fan rotor hub 98 of FIG. 10 includes an inner platform 104 and an outer platform 106. The fan rotor hub 98 also includes a plurality of rotor struts 108. Each of these rotor struts 108 extends radially between and is connected to the inner platform 104 and the outer platform 106. One or more of the rotor struts 108 may be hollow such that an actuation shaft 110 may extend radially therethrough from the actuation system 102 to a respective one of the fan blades 96. In this manner, the actuation system 102 may pivot the fan blades 96 by twisting the actuation shafts 110 in order to change the fan blade 96 pitch.

During operation, referring to FIG. 6, air enters the turbine engine core 52 through the core airflow inlet 74. This air, which may be referred to as "core air", is compressed by the compressor rotors 62 and 68 and directed into a combustion chamber 112 in the combustor 58. Fuel is injected into the combustion chamber 112 and mixed with the compressed air to provide a fuel-air mixture. This fuel air mixture is ignited and combustion products thereof flow through and sequentially cause the turbine rotors 70, 64 and 86 to rotate. The rotation of the turbine rotors 70 and 64 respectively drive rotation of the compressor rotors 68 and 62 and, thus, compression of the air received from the core airflow inlet 74. The rotation of the turbine rotor 86 drives rotation of the fan rotor 84, which propels bypass air through and out of the bypass flowpath 100. The propulsion of the bypass air may account for a majority of thrust generated by the pusher fan engine 26, e.g., more than seventy-five percent (75%) of engine thrust. The pusher fan engine 26 of the present disclosure, however, is not limited to the foregoing exemplary thrust ratio.

Referring to FIGS. 6 and 7, the nacelle 56 forms the bypass flowpath 100 and includes an inner casing 114 and the outer (e.g., fan) casing 50. The bypass flowpath 100 is located radially between the inner casing 114 and the outer casing 50. The bypass flowpath 100 extends axially along the centerline (e.g., 94), for example, through the nacelle 56 from a forward bypass airflow inlet 116 to an aft bypass airflow exhaust nozzle 118.

The inner casing 114 may be configured with or as part of an inner cowling 120 (see FIG. 7), e.g., a core cowling or nacelle. The inner casing 114 houses one or more components of the turbine engine core 52. The inner casing 114 may also house one or more components of the pusher fan system 54 such as, for example, the turbine rotor 86 and/or the gear train 92. The inner casing 114 may be configured as a single unitary case. Alternatively, the inner casing 114 may include a plurality of cases which are attached to one another.

The outer casing 50 houses at least the fan rotor 84. A forward portion of the outer casing 50 also axially overlaps an aft portion of the inner casing 114. The outer casing 50 may be configured as a single unitary case. Alternatively, the outer casing 50 may include a plurality of cases which are attached to one another.

The inner casing 114 is connected to the outer casing 50 through a plurality of guide vanes 122. One or more of these guide vanes 122 may each be configured as a structural guide vane. Each of the guide vanes 122, for example, may structurally tie the inner casing 114 and the outer casing 50 together; i.e., be configured to transfer radial, axial and/or tangential loads between the casings.

The guide vanes 122 are arranged circumferentially around the centerline (e.g., 94) and may be axially aligned in a single array. Each of the guide vanes 122 extends radially between and is attached to the inner casing 114 and the outer casing 50. Each of the guide vanes 122, for example, may be mechanically fastened, welded, brazed and/or adhered to the inner casing 114 and/or the outer casing 50. With such a configuration, the guide vanes 122 provide a single plane mount system between the inner casing 114 and the outer casing 50, which may be directly mounted to the wing 24 via the ribs 48. The pusher fan engine 26 of the present disclosure, however, is not limited to the foregoing exemplary mount system nor single plane mount systems in general.

The pusher fan engine 26 may have various configurations other than that described above and illustrated in the drawings. The pusher fan engine 26, for example, may be configured with a single spool turbine engine core. The fan rotor 84 may be connected to the turbine rotor 86 without the gear train 92. Alternatively, the fan rotor 84 may be directly connected to a spool of the turbine engine core 52 (e.g., the low speed spool) with or without use of the gear train 92. The pusher fan engine 26 may include one or more additional pusher fan rotors, which rotor(s) may or may not be counter-rotating. The present invention, therefore, is not limited to any particular pusher fan engine 26 configurations.

The aircraft 20 may have various configurations other than that described above. For example, while the aircraft 20 is shown in the drawings having a typical passenger or cargo transport configuration, the aircraft 20 may alternatively have a flying wing configuration and/or various other configurations. The present invention, therefore, is not limited to any particular aircraft or wing 24 configurations.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. An aircraft, comprising:
   a wing comprising a pair of ribs;
   a pusher fan engine configured in the wing, the pusher fan engine comprising a core and a fan casing mounted to the ribs;
   the core spanwise between the ribs;
   the fan casing spanwise between and chordwise overlapping the ribs;
   the pusher fan engine further comprising a bypass flowpath, a fan rotor and one or more guide vanes;
   the fan rotor and the one or more guide vanes within the bypass flowpath;
   the one or more guide vanes structurally tying the core with the fan casing and disposed upstream of the fan rotor within the bypass flowpath; and
   an inlet duct extending within the wing from an inlet arranged at a side of the wing to a core airflow inlet of the core,
   wherein an axis of rotation of the fan rotor is non-parallel with an axis of rotation of the core.

2. The aircraft of claim 1, wherein the pusher fan engine has a mid-wing configuration.

3. The aircraft of claim 1, wherein the pusher fan engine includes a nacelle housing at least the fan casing, and the wing intersects the nacelle.

4. The aircraft of claim 1, wherein the side is a suction side of the wing.

5. The aircraft of claim 1, further comprising a splitter configured between the side and the inlet, the splitter adapted to at least partially divert wing boundary layer air away from the inlet.

6. The aircraft of claim 1, wherein the core is aligned with the wing.

7. The aircraft of claim 1, wherein the pusher fan engine is disposed adjacent a trailing edge of the wing.

8. The aircraft of claim 1, wherein the pusher fan engine is configured as a geared pusher fan engine.

9. The aircraft of claim 1, wherein the pusher fan engine further comprises a turbine rotor and a gear train connecting the turbine rotor with the fan rotor.

10. The aircraft of claim 9, wherein the turbine rotor is a free turbine rotor.

11. The aircraft of claim 1, wherein the core is axially forward of the fan rotor.

12. The aircraft of claim 1, wherein each of the ribs extends chordwise to a leading edge of the wing.

13. The aircraft of claim 1, wherein a forward portion of the core is tied to the ribs by a spanwise extending spar.

14. An aircraft, comprising:
a wing comprising a pair of ribs;
a pusher fan engine configured in the wing, the pusher fan engine comprising a core and a fan casing mounted to the ribs;
the core spanwise between the ribs;
the fan casing spanwise between and chordwise overlapping the ribs;
the pusher fan engine further comprising a bypass flowpath, a fan rotor and one or more guide vanes;
the fan rotor and the one or more guide vanes within the bypass flowpath,
the one or more guide vanes structurally tying the core with the fan casing and disposed upstream of the fan rotor within the bypass flowpath; and
an inlet duct extending within the wing from an inlet arranged at a side of the wing to a core airflow inlet of the core,
wherein an axis of rotation of the fan rotor is non-coaxial with an axis of rotation of the core.

15. An aircraft, comprising:
a wing comprising a plurality of structural members;
a pusher fan engine including a plurality of structural guide vanes, a fan rotor, a tubular structural outer casing and a nacelle housing the fan rotor and the structural outer casing, wherein the fan rotor is within the structural outer casing, situated between the structural members and downstream of the guide vanes, and wherein the structural outer casing is between and attached to the structural members; and
an inlet duct extending within the wing to and fluidly coupled with an airflow inlet into a core of the pusher fan engine;
wherein the wing intersects the nacelle;
wherein the guide vanes structurally tie and are fixedly attached to the core and the fan casing,
wherein an axis of rotation of the fan rotor is non-coaxial with an axis of rotation of the core.

16. The aircraft of claim 15, wherein the inlet duct extends at least from an inlet arranged at a side of the wing.

17. The aircraft of claim 15, wherein each of the structural members extends to a leading edge of the wing.

18. The aircraft of claim 5, wherein the splitter comprises a cantilevered flange that is spaced outward from a surface of the wing at the side.

* * * * *